US010899330B2

(12) United States Patent
Schmitz et al.

(10) Patent No.: US 10,899,330 B2
(45) Date of Patent: Jan. 26, 2021

(54) HYDRAULIC VEHICLE BRAKE SYSTEM

(71) Applicant: Robert Bosch GmbH, Stuttgart (DE)

(72) Inventors: David Schmitz, Mundelsheim (DE); Ingo Koehler, Kanagawa (JP); Peter Schubert, Leingarten (DE)

(73) Assignee: Robert Bosch GmbH, Stuttgart (DE)

( * ) Notice: Subject to any disclaimer, the term of this patent is extended or adjusted under 35 U.S.C. 154(b) by 52 days.

(21) Appl. No.: 16/321,853

(22) PCT Filed: May 31, 2017

(86) PCT No.: PCT/EP2017/063193
§ 371 (c)(1),
(2) Date: Jan. 30, 2019

(87) PCT Pub. No.: WO2018/024385
PCT Pub. Date: Feb. 8, 2018

(65) Prior Publication Data
US 2019/0168727 A1    Jun. 6, 2019

(30) Foreign Application Priority Data

Aug. 1, 2016   (DE) .................. 10 2016 214 125

(51) Int. Cl.
*B60T 13/62*    (2006.01)
*B60T 8/40*    (2006.01)
(Continued)

(52) U.S. Cl.
CPC ............ *B60T 13/62* (2013.01); *B60T 8/4081* (2013.01); *B60T 13/686* (2013.01); *B60T 7/042* (2013.01);
(Continued)

(58) Field of Classification Search
CPC .......... B60T 15/16; B60T 15/048; B60T 8/94; B60T 8/341; B60T 8/445; B60T 8/885;
(Continued)

(56) References Cited

U.S. PATENT DOCUMENTS 4,844,558 A * 7/1989 Ishii ..................... B60T 8/3615
  303/116.1
4,971,400 A * 11/1990 Jonner ................... B60T 8/175
  180/197

(Continued)

FOREIGN PATENT DOCUMENTS

DE        3511535 A1    10/1986
DE      35 26 556 A1     1/1987
(Continued)

OTHER PUBLICATIONS

International Search Report for PCT/EP2017/063193, dated Aug. 16, 2017.

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

A hydraulic vehicle brake system having at least one brake pedal, a pedal-travel simulator, at least one hydraulically operable wheel-brake unit and a switching valve between the brake pedal and the pedal-travel simulator. The switching valve is adjustable between a first switching position, in which the brake pedal is connected to the pedal-travel simulator and decoupled from the wheel-brake unit, and a second switching position, in which the brake pedal is decoupled from the pedal-travel simulator and the brake pedal is connected to the wheel-brake unit. In the first switching position, a pressure-supply unit is connected at the same time to the wheel-brake unit.

16 Claims, 2 Drawing Sheets

(51) Int. Cl.
*B60T 13/68* (2006.01)
*B60T 8/32* (2006.01)
*B60T 7/04* (2006.01)

(52) U.S. Cl.
CPC ......... *B60T 8/328* (2013.01); *B60T 2270/404* (2013.01); *B60T 2270/82* (2013.01)

(58) Field of Classification Search
CPC .... B60T 8/4081; B60T 8/4225; B60T 8/4291; B60T 8/4275; B60T 8/4872; B60T 8/5037
USPC .......................... 303/14, 114.4, 116.2, 122.1
See application file for complete search history.

(56) References Cited

U.S. PATENT DOCUMENTS

| | | | | |
|---|---|---|---|---|
| 4,989,925 A | * | 2/1991 | Kohno | B60T 8/4036 |
| | | | | 303/116.2 |
| 5,261,730 A | * | 11/1993 | Steiner | B60T 7/12 |
| | | | | 303/113.4 |
| 2015/0314761 A1 | * | 11/2015 | Cadeddu | B60T 15/36 |
| | | | | 303/5 |

FOREIGN PATENT DOCUMENTS

| | | | | | |
|---|---|---|---|---|---|
| EP | 0265623 A2 | | 5/1988 | | |
| JP | 57158154 A | * | 9/1982 | ............. | B60T 8/441 |
| JP | 08040236 A | * | 2/1996 | ............. | B60T 8/348 |

* cited by examiner

HYDRAULIC VEHICLE BRAKE SYSTEM

FIELD OF THE INVENTION

The present invention relates to a hydraulic vehicle brake system which is equipped with a pedal-travel simulator.

BACKGROUND INFORMATION

Patent document DE 35 26 556 A1 discusses a hydraulic vehicle brake system that is equipped with a pedal-travel simulator, into which hydraulic fluid is displaced in response to an actuation of the brake pedal. The pressure exerted by the driver on the brake pedal is measured by a sensor system and is taken as a basis for the control of an electric pump, via which a brake pressure corresponding to the pedal actuation is adjusted.

SUMMARY OF THE INVENTION

The hydraulic vehicle brake system according to the present invention includes at least one hydraulically operable wheel-brake unit via which, with the aid of a wheel-brake cylinder, for example, a braking force is generated at the relevant wheel. For instance, the wheel-brake unit may be assigned an inlet valve and an outlet valve or a pressure control valve for controlling the brake fluid to the wheel-brake unit and away from it. The hydraulic vehicle brake system is equipped in known manner with at least one brake pedal, via which the driver requests braking power. In addition, the vehicle brake system is provided with a pedal-travel simulator, into which brake fluid is conveyed in response to actuation of the brake pedal.

The hydraulic vehicle brake system may be equipped with exactly one brake pedal or with two brake pedals.

Located between the brake pedal and the pedal-travel simulator is a switching valve that is adjustable between a first switching position in which the brake pedal is connected to the pedal-travel simulator and is decoupled from the wheel-brake unit, and a second switching position in which the pedal-travel simulator is decoupled from the brake pedal and the brake pedal is connected to the wheel-brake unit. In addition, in the first switching position, a pressure-supply unit like, e.g., a pressure accumulator, which has brake fluid under pressure, is connected via an adjustable valve to the wheel-brake unit. The adjustable valve may be identical with the switching valve. However, it is also possible to form the adjustable valve separately from the switching valve.

This design permits braking force to be generated in two different operating states. In the first operating state, which corresponds to the first switching position of the switching valve, brake fluid is shifted into the pedal-travel simulator in response to actuation of the brake pedal, and the wheel-brake unit is supplied by the pressure-supply unit with pressurized brake fluid, in order to generate braking force. On the other hand, in the second operating state, which corresponds to the second switching state of the switching valve, the pressure-supply unit is decoupled from the wheel-brake unit; at the same time, the pedal-travel simulator is also decoupled from the brake pedal, and the brake pedal is connected to the wheel-brake unit, so that brake fluid is conducted into the wheel-brake unit in response to actuation of the brake pedal. This operating state corresponds to a direct access of the brake pedal to the wheel-brake unit, the pressure of the brake fluid possibly being able to be boosted via a booster unit.

This implementation makes it possible to supply and operate the hydraulic vehicle brake system via the brake fluid from the pressure-supply unit. Moreover, no energy supply is needed to generate pressure for the brake fluid. The pressure-supply unit represents an energy accumulator with hydraulic fluid that possibly may also be used for further functions in the vehicle, especially in the case of commercial vehicles, e.g., for use in agricultural machinery in off-road operation. For example, such a pressure-supply unit may be present in a commercial agricultural vehicle. In utilizing the pressure-supply unit for the hydraulic vehicle brake system, the available energy potential is used for vehicle braking. However, over and above that, the pressure-supply unit may also be used for further functions in the vehicle.

This design of the hydraulic vehicle brake system permits an operation in which, given proper functioning of all electrically operable components of the vehicle brake system, especially the valves, and given correct functioning of the pressure-supply unit, the switching valve is switched in such a way that the first operating state, with the wheel-brake unit being acted upon via the pressure-supply unit, is realized. The second operating state, in which pressure is built up in the brake fluid in the wheel-brake unit directly via the brake pedal, is used as passive fallback solution. Accordingly, in the de-energized state, the switching valve is advantageously in the second switching position, in which the pedal-travel simulator is decoupled and the brake pedal is connected to the wheel-brake unit. In the second switching position, the pressure-supply unit is decoupled from the wheel-brake unit, so that the wheel-brake unit is supplied with pressurized hydraulic fluid solely by actuation of the brake pedal, a brake-booster unit possibly being able to be provided to boost the brake pressure.

A pressure sensor for determining the hydraulic brake-fluid pressure is located advantageously in at least one connecting line, via which brake fluid is conducted to the wheel-brake unit. In addition, it may be expedient to place a further pressure sensor directly at the wheel-brake unit, via which the brake-fluid pressure in the wheel-brake unit is able to be determined.

According to another expedient embodiment, a further valve is located in the flow path between the pressure-supply unit and the at least one wheel-brake unit. The valve, which, for example, is in the form of a brake-by-wire valve, is in the blocking position when in the de-energized state, and thereby decouples the pressure-supply unit from the at least one wheel-brake unit.

According to a further expedient embodiment, the vehicle brake system includes at least two wheel-brake units, each of which, as necessary, may be assigned an inlet valve and an outlet valve or a pressure-control valve, especially at the two opposite wheels of a vehicle axle. In an exemplary embodiment, the vehicle brake system includes two brake circuits, each having at least one hydraulically operable wheel-brake unit, each of which may have two wheel-brake units, the two wheel-brake units being disposed—per brake circuit—either at the opposite wheels on the same axle or diagonally offset at opposite axles. In addition, the second brake circuit is connected hydraulically to the first brake circuit. This implementation makes it possible in the second operating and switching state with decoupled pedal-travel simulator, to supply both brake circuits with brake fluid via the brake pedal.

It is also possible to provide one pressure-supply unit in common for both brake circuits, from which in the first operating and switching state, both brake circuits are supplied with the pressurized brake fluid. In the connection between the first and the second brake circuit, it may possibly be expedient to place a hydraulic ratio valve, in which a pressure change is implemented in the second brake circuit relative to the first brake circuit, thus, a pressure boost with a higher pressure in the second brake circuit, or a pressure reduction with a lower pressure in the second brake circuit, in relation to the first brake circuit. It is therefore possible in the second operating and switching state, for example, to set different pressure levels in the first and in the second brake circuit in response to an actuation of the brake pedal. The same holds true in the case of only one pressure-supply unit for both brake circuits, which is connected either to the first or to the second brake circuit.

In the event that a separate pressure-supply unit is assigned to each brake circuit, a hydraulic ratio valve may likewise be disposed in the connection between the brake circuits, especially for the case when in the second operating state, a hydraulic brake pressure is generated in the wheel-brake units of both brake circuits via an actuation of the brake pedal. In the first operating state, with the wheel-brake units being supplied via the respective pressure-supply unit, the hydraulic ratio valve may be in a blocking position, so that the brake circuits are separated hydraulically. In this position, only the pressure from the pressure-supply unit, which may be different or the same, prevails in each brake circuit.

The additional pressure-supply unit in the further brake circuit may possibly be connected to this brake circuit via a further switching valve, which in the de-energized state, decouples the additional pressure-supply unit from the further brake circuit. The switching valve may be identical to the hydraulic ratio valve for connecting the second to the first circuit. In the current-free state, the hydraulic ratio valve is switched in a manner that a flow connection is open between the brake circuits.

According to a further expedient embodiment, the outlet valve at the at least one wheel-brake unit is flow-connected to a reservoir, into which the brake fluid flows off when the outlet valve is open. Advantageously, the outlet valve is implemented in such a way that in the de-energized state, it decouples the reservoir from the wheel-brake unit. This ensures that in the fallback solution—the second operating state—upon actuation of the brake pedal, the displaced brake fluid remains in the wheel-brake unit and is not discharged via the outlet valve into the reservoir.

If two brake circuits are present, either they may be connected via the outlet valves to one reservoir in common, or one reservoir is provided per brake circuit.

The vehicle brake system may be equipped with a regulating or control unit for controlling the adjustable components of the vehicle brake system. Signals from sensors of the vehicle brake system are processed and actuating signals for controlling the components in the vehicle brake system are generated in the regulating or control unit.

For example, the vehicle which is equipped with the vehicle brake system according to the present invention is a commercial vehicle, for instance, a commercial vehicle usable in off-road operation or an agricultural vehicle, e.g., a tractor.

Various modes of operation may be realized with the vehicle brake system. According to a first method for operating the vehicle brake system, in order to realize an antilock braking system (ABS) continuously on the basis of sensor information, especially from rotational-speed sensors, an incipient lock of a wheel may be ascertained, and the brake-pressure level at the assigned wheel-brake unit may be reduced by closing the inlet valve and opening the outlet valve. In the case of several wheel-brake units, the respective assigned inlet and outlet valves may be closed and opened independently of the valves of the other wheel-brake units.

According to a further method for operating the vehicle brake system, an electronic stability program (ESP) may be realized for vehicle stabilization. To that end, the rotation of the vehicle about the vertical axis is ascertained, especially via a yaw-rate sensor, and compared to the driver command which may be determined from information of a steering-angle sensor and the rotational-speed sensors. In response to a deviation between the driver command and the actual position of the vehicle, the vehicle may be stabilized by opening or closing the inlet and outlet valves at at least one wheel-brake unit, possibly at several wheel-brake units.

Both in the realization of the antilock braking system as well as the electronic stability program, in the first operating state, it is possible to draw on the pressurized brake fluid in the pressure-supply unit.

This also holds true in the case of a further method for operating the vehicle brake system to realize an active trailer brake, in which at least one wheel-brake unit in the trailer of the vehicle is braked via the brake fluid in the pressure-supply unit.

Additional advantages and useful embodiments may be gathered from the further claims, the figure description and the drawings.

DETAILED DESCRIPTION

Figure 1:
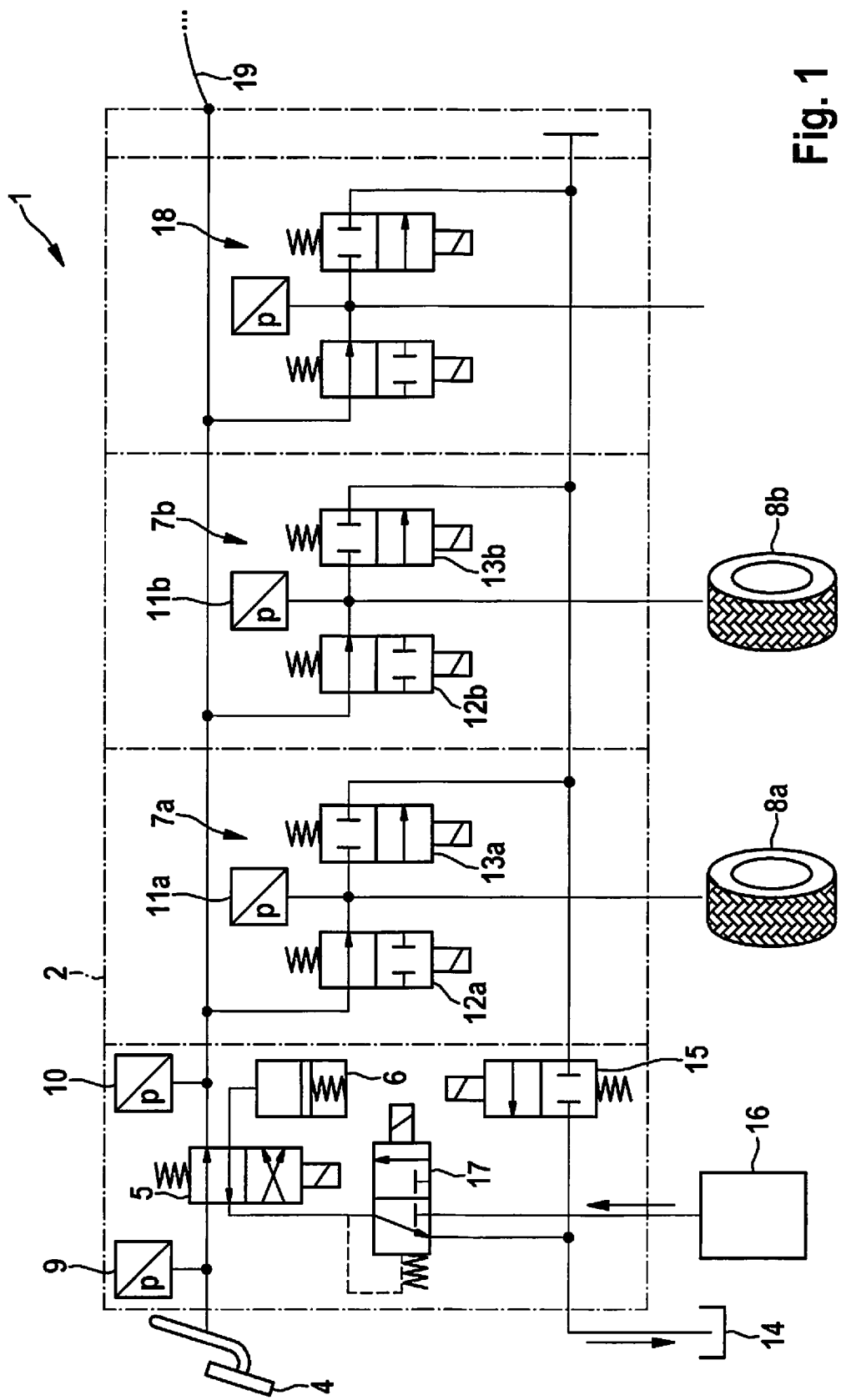
FIG. 1 shows a connection diagram of a hydraulic vehicle brake system having a first brake circuit for the wheels at the rear axle of the vehicle.
Figure 2:
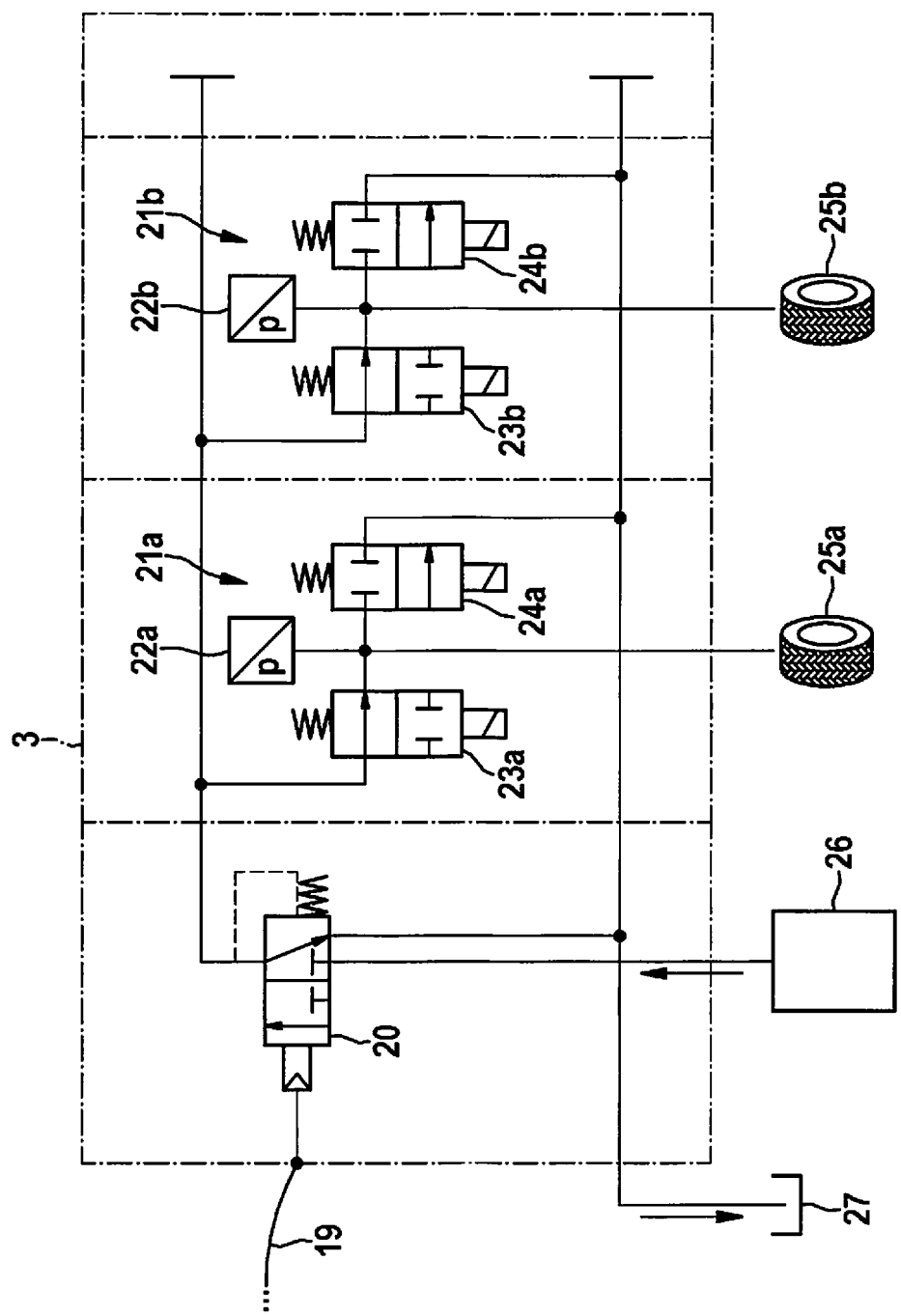
FIG. 2 shows the continuation of the connection diagram for the wheels at the front axle of the vehicle.

Vehicle brake system 1 represented in FIGS. 1 and 2, of which rear-axle brake circuit 2 is shown in FIG. 1 and front-axle brake circuit 3 is shown in FIG. 2, is installed, e.g., in commercial vehicles such as agricultural vehicles, for instance. Vehicle brake system 1 includes a brake pedal 4 that is connected hydraulically via a switching valve 5 first of all to a pedal-travel simulator 6, and secondly to wheel-brake units 7a, 7b at wheels 8a, 8b of the rear axle.

A pressure sensor 9 is located between brake pedal 4 and switching valve 5; a further pressure sensor 10 is disposed in between switching valve 5 and wheel-brake units 7a, 7b. In addition, a pressure sensor 11a, 11b is assigned to each wheel-brake unit 7a, 7b.

Each wheel-brake unit 7a, 7b has an inlet valve 12a, 12b and an outlet valve 13a, 13b at a wheel-brake cylinder, brake fluid being conducted to and away from the wheel-brake cylinder via the valves. Outlet valves 13a, 13b are connected via one common return-flow line to a reservoir 14, into which brake fluid flows back when the outlet valve is open, as indicated by the arrow. Disposed in the return line is a valve 15 which, in the de-energized state, is in its blocking position and interrupts the return flow to reservoir 14.

In addition, vehicle brake system 1 is assigned a pressure-supply unit 16 having brake fluid under pressure, which is connected via a brake-by-wire valve 17 to switching valve 5. In the de-energized state, brake-by-wire valve 17 is in its blocking position interrupting the flow from pressure-supply unit 16, and in the energized state, is in the open position in which a flow connection is made possible via switching valve 5 from pressure-supply unit 16 to wheel-brake units 7a, 7b, permitting the flow. In the de-energized state, switching valve 5 is in a position decoupling pedal-travel simulator 6, at the same time brake pedal 4 being connected to wheel-brake units 7a, 7b. On the other hand, in the energized state, the switching valve is in a switching position in which the pedal-travel simulator is coupled to brake pedal 4, so that in response to an actuation of brake pedal 4, brake fluid is moved into pedal-travel simulator 6. At the same time, a flow connection between brake-by-wire valve 17 and wheel-brake units 7a, 7b is open, so that the brake fluid gets from pressure-supply unit 16 via brake-by-wire valve 17 and switching valve 5 to wheel-brake units 7a, 7b.

As an option, a further wheel-brake unit 18 that is located, for example, in a trailer of the vehicle, is coupled to first brake circuit 2, so that wheel-brake unit 18 is supplied with brake fluid in the same manner as wheel-brake units 7a and 7b at the rear wheels of the vehicle.

First brake circuit 2 for the rear axle of the vehicle is connected via a hydraulic connecting line 19 to second brake circuit 3 for the front axle of the vehicle. Located between first and second brake circuits 2, 3 is a hydraulic ratio valve 20, via which a pressure boost, possibly a pressure reduction, may be implemented between first and second brake circuits 2, 3. Second brake circuit 3 includes wheel-brake units 21a, 21b, each having a pressure sensor 22a, 22b and inlet valves 23a and 23b as well as outlet valves 24a and 24b. The brake cylinders of wheel-brake units 21a and 21b brake front wheels 25a, 25b of the vehicle.

Second brake circuit 3 for the front axle of the vehicle is assigned a further pressure-supply unit 26 having brake fluid under pressure, which is flow-connected via hydraulic ratio valve 20 to wheel-brake units 21a, 21b at the front axle. Hydraulic ratio valve 20 may assume a position decoupling pressure-supply unit 26, and at the same time hydraulically connecting brake circuits 2 and 3, so that brake fluid flows over from brake circuit 2 via ratio valve 20 into brake circuit 3. On the other hand, in a further position of hydraulic ratio valve 20, the connection between brake circuits 2 and 3 is blocked, and at the same time, the flow connection between second pressure-supply unit 26 and wheel-brake units 21a, 21b is open.

Outlet valves 24a, 24b of wheel-brake units 21a, 21b are connected via a return line to a further reservoir 27, into which the brake fluid flows off when outlet valves 24a, 24b are open.

In the normal case, during proper functioning without failure of a component, upon actuation of brake pedal 4, brake fluid is conducted out of pressure-supply units 16, 26 into assigned brake circuits 2, 3 to wheel-brake units 7a, 7b and 21a, 21b. Various functions may be realized via a control of the assigned inlet and outlet valves, e.g., an antilock braking system or an electronic stability program within the framework of driving-assistance systems, for instance, for which additional information from sensors in the vehicle, e.g., rotational-speed sensors or yaw-rate sensors is evaluated. The movement of the brake pedal leads to a shift of brake fluid into pedal-travel simulator 6. The actuation of the brake pedal may be detected by sensor, and leads to a corresponding control of the inlet and outlet valves in order to apply the desired instantaneous braking power.

In the exemplary embodiment, in each case a pressure-supply unit 16, 26 is provided for each brake circuit 2, 3. The two brake circuits 2, 3 may be supplied from the two pressure-supply units 16, 26 with the same or different brake fluid and/or the same or different braking pressure.

In an alternative embodiment, it is also possible to dispense with pressure-supply unit 26 in brake circuit 3, and instead—also in the operating state in which the wheel-brake units in first brake circuit 2 are supplied from pressure-supply unit 16—to likewise supply the wheel-brake units in second brake circuit 3 from pressure-supply unit 16. In this case, to realize a differing brake pressure at wheel-brake units 21a, 21b of second brake circuit 3, it may be expedient to implement a pressure boost via ratio valve 20.

In response to a failure of an electrically controllable component or a pressure-supply unit, the passive fallback solution becomes active by transferring the valves into their de-energized state, in which the actuation of brake pedal 4 leads directly to a pressure increase of the brake fluid both at wheel-brake units 7a, 7b in first brake circuit 2 and wheel-brake units 21a, 21b in second brake circuit 3.

What is claimed is:

1. A hydraulic vehicle brake system comprising:
at least one brake pedal;
a pedal-travel simulator;
at least one hydraulically operable wheel-brake unit; and,
a switching valve between the brake pedal and the pedal-travel simulator, the switching valve being adjustable between a first switching position in which the brake pedal is connected to the pedal-travel simulator and decoupled from the wheel-brake unit, and a second switching position in which the brake pedal is decoupled from the pedal-travel simulator and the brake pedal is connected to the wheel-brake unit, wherein:
when the switching valve is in the first switching position, a first pressure-supply unit is connectable to the wheel-brake unit; and
any one or more of the following (1)-(4):
(1) the connectability of the first pressure-supply unit to the wheel-brake unit is via the switching valve;
(2) the switching valve is in the first switching position whenever the switching valve is energized and is in the second switching position whenever the switching valve is de-energized;
(3) the hydraulic vehicle brake system further includes a brake-by-wire valve that is in a flow path between the first pressure-supply unit and the at least one wheel-brake unit, and the first pressure-supply unit is decoupled from the at least one wheel-brake unit whenever the switching valve is de-energized; and
(4) the vehicle brake system includes a first brake circuit and a second brake circuit, the first and second brake circuits each including one or more of the at least one hydraulically operable wheel-brake unit, and (i) the first and second brake circuits are connected to each other via a hydraulic ratio valve, and/or (ii) the second brake circuit is operable by a second pressure-supply unit that is independent from the first pressure-supply unit.

2. The vehicle brake system of claim 1, wherein the vehicle brake system includes the two brake circuits, and the second brake circuit is connected hydraulically to the first brake circuit.

3. The vehicle brake system of claim 1, further comprising an outlet valve at the wheel-brake unit that is flow-connected to a reservoir.

4. The vehicle brake system of claim 3, wherein, when the outlet valve is de-energized, the outlet valve decouples the reservoir from the wheel-brake unit.

5. The vehicle brake system of claim 1, having a regulating/control unit for controlling the switching valve.

6. The vehicle brake system of claim 1, wherein the connectability of the first pressure-supply unit to the wheel-brake unit is via the switching valve.

7. The vehicle brake system of claim 1, wherein the switching valve is in the first switching position whenever the switching valve is energized and is in the second switching position whenever the switching valve is de-energized.

8. The vehicle brake system of claim 1, wherein the hydraulic vehicle brake system further includes the brake-by-wire valve that is in the flow path between the first pressure-supply unit and the at least one wheel-brake unit, and the first pressure-supply unit is decoupled from the at least one wheel-brake unit whenever the switching valve is de-energized.

9. The vehicle brake system of claim 8, wherein the connectability of the first pressure-supply unit to the wheel-brake unit is additionally via the switching valve.

10. The vehicle brake system of claim 1, wherein the vehicle brake system includes the first and second brake circuits, and the first and second brake circuits are connected to each other via the hydraulic ratio valve.

11. The vehicle brake system of claim 1, wherein the vehicle brake system includes the first and second brake circuits, and the second brake circuit is operable by the second pressure-supply unit that is independent from the first pressure-supply unit.

12. A vehicle comprising:
a vehicle brake system including:
at least one brake pedal;
a pedal-travel simulator;
at least one hydraulically operable wheel-brake unit; and
a switching valve between the brake pedal and the pedal-travel simulator, the switching valve being adjustable between a first switching position in which the brake pedal is connected to the pedal-travel simulator and decoupled from the wheel-brake unit, and a second switching position in which the brake pedal is decoupled from the pedal-travel simulator and the brake pedal is connected to the wheel-brake unit, wherein:
when the switching valve is in the first switching position, a first pressure-supply unit is connectable to the wheel-brake unit; and
any one or more of the following (1)-(4):
(1) the connectability of the first pressure-supply unit to the wheel-brake unit is via the switching valve;
(2) the switching valve is in the first switching position whenever the switching valve is energized and is in the second switching position whenever the switching valve is de-energized;
(3) the hydraulic vehicle brake system further includes a brake-by-wire valve that is in a flow path between the first pressure-supply unit and the at least one wheel-brake unit, and the first pressure-supply unit is decoupled from the at least one wheel-brake unit whenever the switching valve is de-energized; and
(4) the vehicle brake system includes a first brake circuit and a second brake circuit, the first and second brake circuits each including one or more of the at least one hydraulically operable wheel-brake unit, and (i) the first and second brake circuits are connected to each other via a hydraulic ratio valve, and/or (ii) the second brake circuit is operable by a second pressure-supply unit that is independent from the first pressure-supply unit.

13. A regulator/controller comprising:
a regulating/control unit to control switching valve of a vehicle brake system, wherein:
the vehicle brake system includes:
at least one brake pedal;
a pedal-travel simulator;
at least one hydraulically operable wheel-brake unit; and
a switching valve between the brake pedal and the pedal-travel simulator, the switching valve being adjustable between a first switching position in which the brake pedal is connected to the pedal-travel simulator and decoupled from the wheel-brake unit, and a second switching position in which the brake pedal is decoupled from the pedal-travel simulator and the brake pedal is connected to the wheel-brake unit;
when the switching valve is in the first switching position, a first pressure-supply unit is connectable to the wheel-brake unit; and
any one or more of the following (1)-(4):
(1) the connectability of the first pressure-supply unit to the wheel-brake unit is via the switching valve;
(2) the switching valve is in the first switching position whenever the switching valve is energized and is in the second switching position whenever the switching valve is de-energized;
(3) the hydraulic vehicle brake system further includes a brake-by-wire valve that is in a flow path between the first pressure-supply unit and the at least one wheel-brake unit, and the first pressure-supply unit is decoupled from the at least one wheel-brake unit whenever the switching valve is de-energized; and
(4) the vehicle brake system includes a first brake circuit and a second brake circuit, the first and second brake circuits each including one or more of the at least one hydraulically operable wheel-brake unit, and (i) the first and second brake circuits are connected to each other via a hydraulic ratio valve, and/or (ii) the second brake circuit is operable by a second pressure-supply unit that is independent from the first pressure-supply unit.

14. A method for operating a vehicle brake system, the method comprising:
ascertaining an incipient lock of a wheel to realize an antilock braking system; and
reducing a brake-pressure level at at least one hydraulically operable wheel-brake unit by closing an inlet valve and opening an outlet valve;
wherein:
the vehicle brake system includes:
at least one brake pedal;
a pedal-travel simulator;
the at least one hydraulically operable wheel-brake unit; and
a switching valve between the brake pedal and the pedal-travel simulator, the switching valve being adjustable between a first switching position in which the brake pedal is connected to the pedal-travel simulator and decoupled from the wheel-brake unit, and a second switching position in which the brake pedal is decoupled from the pedal-travel simulator and the brake pedal is connected to the wheel-brake unit;

when the switching valve is in the first switching position, a first pressure-supply unit is connectable to the wheel-brake unit; and any one or more of the following (1)-(4):
(1) the connectability of the first pressure-supply unit to the wheel-brake unit is via the switching valve;
(2) the switching valve is in the first switching position whenever the switching valve is energized and is in the second switching position whenever the switching valve is de-energized;
(3) the hydraulic vehicle brake system further includes a brake-by-wire valve that is in a flow path between the first pressure-supply unit and the at least one wheel-brake unit, and the first pressure-supply unit is decoupled from the at least one wheel-brake unit whenever the switching valve is de-energized; and
(4) the vehicle brake system includes a first brake circuit and a second brake circuit, the first and second brake circuits each including one or more of the at least one hydraulically operable wheel-brake unit, and (i) the first and second brake circuits are connected to each other via a hydraulic ratio valve, and/or (ii) the second brake circuit is operable by a second pressure-supply unit that is independent from the first pressure-supply unit.

15. A method for operating a vehicle brake system, the method comprising:
ascertaining, to realize an electronic stability program, a rotation of the vehicle about a vertical axis and comparing it to a driver command, determined from steering-angle sensors and rotational-speed sensors; and
stabilizing, in the event of a deviation, the vehicle by opening or closing inlet valves and outlet valves at at least one hydraulically operable wheel-brake unit;
wherein:
the vehicle brake system includes:
at least one brake pedal;
a pedal-travel simulator;
the at least one hydraulically operable wheel-brake unit; and
a switching valve between the brake pedal and the pedal-travel simulator, the switching valve being adjustable between a first switching position in which the brake pedal is connected to the pedal-travel simulator and decoupled from the wheel-brake unit, and a second switching position in which the brake pedal is decoupled from the pedal-travel simulator and the brake pedal is connected to the wheel-brake unit;
when the switching valve is in the first switching position, a first pressure-supply unit is connectable to the wheel-brake unit; and
any one or more of the following (1)-(4):
(1) the connectability of the first pressure-supply unit to the wheel-brake unit is via the switching valve;
(2) the switching valve is in the first switching position whenever the switching valve is energized and is in the second switching position whenever the switching valve is de-energized;
(3) the hydraulic vehicle brake system further includes a brake-by-wire valve that is in a flow path between the first pressure-supply unit and the at least one wheel-brake unit, and the first pressure-supply unit is decoupled from the at least one wheel-brake unit whenever the switching valve is de-energized; and
(4) the vehicle brake system includes a first brake circuit and a second brake circuit, the first and second brake circuits each including one or more of the at least one hydraulically operable wheel-brake unit, and (i) the first and second brake circuits are connected to each other via a hydraulic ratio valve, and/or (ii) the second brake circuit is operable by a second pressure-supply unit that is independent from the first pressure-supply unit.

16. A method for operating a vehicle brake system, the method comprising:
braking at least one hydraulically operable wheel-brake unit in a trailer of the vehicle via a brake fluid in a pressure-supply unit;
wherein:
the vehicle brake system includes:
at least one brake pedal;
a pedal-travel simulator;
the at least one hydraulically operable wheel-brake unit; and
a switching valve between the brake pedal and the pedal-travel simulator, the switching valve being adjustable between a first switching position in which the brake pedal is connected to the pedal-travel simulator and decoupled from the wheel-brake unit, and a second switching position in which the brake pedal is decoupled from the pedal-travel simulator and the brake pedal is connected to the wheel-brake unit;
when the switching valve is in the first switching position, a first pressure-supply unit is connectable to the wheel-brake unit; and
any one or more of the following (1)-(4):
(1) the connectability of the first pressure-supply unit to the wheel-brake unit is via the switching valve;
(2) the switching valve is in the first switching position whenever the switching valve is energized and is in the second switching position whenever the switching valve is de-energized;
(3) the hydraulic vehicle brake system further includes a brake-by-wire valve that is in a flow path between the first pressure-supply unit and the at least one wheel-brake unit, and the first pressure-supply unit is decoupled from the at least one wheel-brake unit whenever the switching valve is de-energized; and
(4) the vehicle brake system includes a first brake circuit and a second brake circuit, the first and second brake circuits each including one or more of the at least one hydraulically operable wheel-brake unit, and (i) the first and second brake circuits are connected to each other via a hydraulic ratio valve, and/or (ii) the second brake circuit is operable by a second pressure-supply unit that is independent from the first pressure-supply unit.

* * * * *